(12) United States Patent
Petricevic

(10) Patent No.: US 9,880,049 B2
(45) Date of Patent: Jan. 30, 2018

(54) MEASURING DEVICE AND COMPONENT WITH MEASURING DEVICE INTEGRATED THEREIN

(71) Applicant: iNDTact GmbH, Wuerzburg (DE)

(72) Inventor: Raino Petricevic, Würzburg (DE)

(73) Assignee: INDTACT GMBH, Wuerzburg (DE)

( * ) Notice: Subject to any disclaimer, the term of this patent is extended or adjusted under 35 U.S.C. 154(b) by 158 days.

(21) Appl. No.: 14/649,086

(22) PCT Filed: Dec. 3, 2013

(86) PCT No.: PCT/EP2013/075413
§ 371 (c)(1),
(2) Date: Jun. 2, 2015

(87) PCT Pub. No.: WO2014/086793
PCT Pub. Date: Jun. 12, 2014

(65) Prior Publication Data
US 2016/0202113 A1    Jul. 14, 2016

(30) Foreign Application Priority Data
Dec. 4, 2012    (DE) .................. 10 2012 222 239

(51) Int. Cl.
*G01H 11/08*    (2006.01)
*G01K 11/16*    (2006.01)
(Continued)

(52) U.S. Cl.
CPC .............. *G01H 11/08* (2013.01); *G01H 1/00* (2013.01); *G10K 11/002* (2013.01); *G10K 9/122* (2013.01); *G10K 9/22* (2013.01)

(58) Field of Classification Search
CPC ...... G01H 11/008; G01H 1/003; G01H 11/08; G01K 11/002; G01K 9/122; G01K 9/22
See application file for complete search history.

(56) References Cited

U.S. PATENT DOCUMENTS 4,081,889 A * 4/1978 Levine .................. B06B 1/0603
29/25.35
4,408,479 A    10/1983 Asai et al.
(Continued)

FOREIGN PATENT DOCUMENTS

DE    103 41 900 A1    6/2004
DE    10 2005 006 666 A1    8/2006
(Continued)

OTHER PUBLICATIONS

PCT, "International Preliminary Report on Patentability for International Application No. PCT/EP2013/075413."
(Continued)

*Primary Examiner* — Helen Kwok
(74) *Attorney, Agent, or Firm* — Manabu Kanesaka

(57) ABSTRACT

The invention relates to a measuring device for measuring mechanical stresses or vibrations occurring in a component, wherein the measuring device comprises at least one electromechanical transducer, which can be integrated in a force-locked manner into the component, and at least one electronic unit, which is connected to the transducer via signal lines and is used to record and process the signals delivered by the transducer. In order to improve the robustness of the arrangement, it is provided according to the invention that the electronic unit is at least partially surrounded by a housing, and wherein a compensation zone for absorbing relative movements between the housing and the electronic unit is provided between the housing and the electronic unit.

17 Claims, 6 Drawing Sheets

(51) Int. Cl.
  *G01H 1/00* (2006.01)
  *G10K 11/00* (2006.01)
  *G10K 9/122* (2006.01)
  *G10K 9/22* (2006.01)

(56) References Cited

U.S. PATENT DOCUMENTS

| | | | |
|---|---|---|---|
| 4,556,814 A | 12/1985 | Ito et al. | |
| 5,025,666 A | 6/1991 | Kobayashi et al. | |
| 5,987,992 A | 11/1999 | Watanabe et al. | |
| 6,252,334 B1 | 6/2001 | Nye et al. | |
| 7,191,658 B2 * | 3/2007 | Oda | G01L 9/006 73/35.03 |
| 7,316,164 B2 * | 1/2008 | Toyoda | G01L 9/0064 73/114.18 |
| 7,737,609 B2 * | 6/2010 | Murata | G10K 9/122 310/348 |
| 8,286,496 B2 * | 10/2012 | Sekiya | G01L 19/142 73/715 |
| 8,288,920 B2 * | 10/2012 | Mueller | G10K 11/002 310/326 |
| 2003/0030565 A1 | 2/2003 | Sakatani et al. | |
| 2006/0090544 A1 * | 5/2006 | Yorita | G01L 23/22 73/35.12 |
| 2008/0184802 A1 * | 8/2008 | Sato | G01S 7/521 73/632 |
| 2011/0290584 A1 * | 12/2011 | Sato | G10K 9/122 181/211 |

FOREIGN PATENT DOCUMENTS

| | | |
|---|---|---|
| DE | 10 2006 035 274 A1 | 2/2008 |
| DE | 10 2009 022 187 A1 | 11/2010 |
| EP | 2372802 A2 | 10/2011 |
| JP | S60-136599 U | 9/1985 |
| JP | H07-26732 U | 5/1995 |
| JP | H07-218332 A | 8/1995 |
| JP | 2008-271337 A | 11/2008 |

OTHER PUBLICATIONS

PCT, "International Search Report for International Application No. PCT/EP2013/075413".

Japan Patent Office, "Office Action for Japanese Patent Application No. 2015-545786," dated Aug. 16, 2017.

* cited by examiner

MEASURING DEVICE AND COMPONENT WITH MEASURING DEVICE INTEGRATED THEREIN

RELATED APPLICATIONS

The present application is National Phase of International Application No. PCT/EP2013/075413 filed Dec. 3, 2013, and claims priority from German Application No. 10 2012 222 239.1, filed Dec. 4, 2012, the disclosure of which is hereby incorporated by reference herein in its entirety.

FIELD OF INVENTION

The invention relates to a measuring device. The invention further relates to a component having a measuring device integrated therein.

BACKGROUND OF THE INVENTION

Such a measuring device is known from US 2003/0030565 A1. In the known measuring device, an electromechanical transducer for detecting vibrations of a bearing and an electronic unit for recording and processing signals delivered by the transducer are mounted on a printed circuit board. The printed circuit board is surrounded by a housing. An intermediate space between the printed circuit board having the transducer accommodated thereon and having the unit accommodated thereon is filled with a rubber-like mass, e.g., silicone.

A further component having a measuring device is known from U.S. Pat. No. 6,252,334 B1, for example. In that case, control electronics are connected to a piezoelectric transducer integrated into the component by means of an interface plate provided with plated through-holes. The control electronics are mounted on an outer side of the component. As a result, the field of application of the known measuring device is limited. Said measuring device is not suitable, e.g., for monitoring components having surfaces that are exposed to heat, cold, flowing media, and the like. For example, the known measuring device is not suitable for measuring stresses in rotor blades of a helicopter, rotor blades for wind power systems, wheel rims and land wheels of motor vehicles, and the like.

EP 2 372 802 A2 discloses an electromechanical transducer, in which a piezoelectric transducer and conductive tracks connected thereto are integrated in an overall composite formed from a stabilized polymer prepreg.

DE 10 2006 035 274 A1 describes a fiber-reinforced component, in which a sensor unit, a power supply, and light-emitting diodes are integrated into the fiber-reinforced component. The sensor unit is mounted outside of the neutral fiber of the fiber-reinforced component. As protection against the effects of mechanical stresses, the power supply and the signal processing are arranged in the region of the neutral fiber of the fiber-reinforced component.

DE 10 2005 006 666 A1 discloses a piezoelectric sensor, which comprises a piezoelectric measurement-value receiver, an amplification circuit, and at least one connection for external power or signal lines. The aforementioned elements are integrated on or in a support structure.

In the known measuring devices, the connection between the transducer and the control electronics, which is established via signal lines, is susceptible to interference. The control electronics can be integrated into a neutral fiber of a component only in the case of certain components.

PROBLEMS TO BE SOLVED BY THE INVENTION

The problem addressed by the invention is that of eliminating the disadvantages of the prior art. The object, in particular, is to provide a universal and fail-safe measuring device for integration into a component, and to provide a component.

BRIEF SUMMARY OF THE INVENTION

This problem is solved by the features the invention. Advantageous embodiments of the invention will become apparent from variants of the invention.

According to the invention, the transducer is directly connected to the housing in a force-locked and material-locked manner or the transducer can be connected to the housing via the component in a force-locked and material-locked manner.

Within the meaning of the present invention, a "force-locked and material-locked connection" means, in particular, that vibrations between the elements that are connected to one another in a force-locked and material-locked manner are transferred substantially without loss of energy and/or phase displacement. Within the meaning of the present invention, elements that are connected to one another in a force-locked and material-locked manner behave approximately like an element made from a single piece in terms of the propagation of vibrations. The effect of vibrations does not induce relative movement between the elements that are connected in a force-locked and material-locked manner.

According to a first variant of the invention, the transducer is directly connected to the housing in a force-locked and material-locked manner. When the housing is integrated into the component, vibrations are transmitted from the component, via the housing, directly to the transducer, which is connected to said housing in a force-locked and material-locked manner. Advantageously, the housing is also integrated into the component in a force-locked and material-locked manner.

According to a second variant of the invention, the transducer can be connected to the housing via the component in a force-locked and material-locked manner. That is, in this case, the force-locked and material-locked connection between the transducer and the housing is first established upon integration into the component. The connection between the component and the transducer, as well as the connection between the component and the housing are force-locked and material-locked in this case. This also ensures that the housing and the transducer behave approximately like a single-piece component in terms of the propagation of vibrations.

Given that the transducer, according to the invention, is connected directly to the component or indirectly to the component via the housing in a force-locked and material-locked manner, an optimal transmission of vibrations of the component to the transducer is achieved. Energy losses in the transmission of vibrations or a phase shift are avoided. The proposed measuring device is characterized by sensitivity that is considerably improved relative to the prior art. It is therefore possible, for example, to detect extremely weak seismic vibrations.

According to another feature of the invention, the electronic unit is at least partially surrounded by the housing, wherein a compensation zone for absorbing relative movements between the housing and the electronic unit is provided between the electronic unit and the housing. There is no direct force-locked connection between the electronic unit and the material forming the housing. As a result, the effect of mechanical stresses on the housing induces relative movements between the electronic unit and the housing. The compensation zone is designed such that a material forming the housing moves relative to the electronic unit only such that there is no direct contact and, therefore, no transmission of mechanical stresses onto the electronic unit. This prevents the electronic unit from becoming damaged by mechanical stresses that are transmitted from the component onto the housing.—The measuring device proposed according to the invention can be integrated into a component. In particular, it is not necessary to arrange the electronic unit in the region of a neutral fiber of the component. This creates new freedoms in the design and configuration of components.

According to an advantageous embodiment, the compensation zone is formed by a layer, which is made from a first elastic material. Advantageously, the first elastic material is a material having a modulus of elasticity in the range of 0.001 to 10 GPa and/or a non-linear elastic behavior. Advantageously, the first material has a modulus of elasticity in the range of 0.1 to 10 GPa.

According to another advantageous embodiment, the layer is produced by casting around the unit. The casting around the electronic unit can be carried out, e.g., by means of injection molding, die casting, resin transfer molding, prepreg processes, hot pressing, vacuum bag processes in autoclaves, or the like. Furthermore, it is also possible to insert a preformed part made of the first elastic material onto the electronic unit or to provide the electronic unit with the preformed part. The preformed part can be a ring, a cap, a plate, or the like.

Advantageously, the first elastic material is made from one of the following materials: PP, TPU, PA, PPS, epoxide, LCP, TPI, PAI, PPS, PPSU, PEK, PEEK, phenol, PE, silicone, rubber, polymer foam. The first elastic material can also be fiber-reinforced. The fibers can be made, e.g., from E-glass, polymer, aramid, carbon, metal, or ceramic. These can also be natural fibers. It is conceivable to use blended fibers in the form of fabrics, multidirectional fiber scrims, woven rovings, unidirectional non-wovens, crossplys)(0°/90°, crossplys)(0°/45°, fleeces, continuous fibers, or individual long- or short-fibers.

According to an alternative embodiment, the compensation zone can also be a gap, which surrounds the electronic unit, at least in sections. Providing a gap also makes it possible to mechanically decouple the electronic unit from the material forming the unit. It is also possible that the electronic component cast around with the layer is at least partially surrounded by a gap.

Advantageously, the housing is produced from a second elastic material. The second elastic material can be a material having a largely linear elastic behavior. The second elastic material is advantageously formed from one of the following materials: epoxide, PA, phenol, PE, PU, PP, TPU, LCP, TPI, PAI, PA, PPS, PPSU, PI, PEK, PEEK. The second elastic material can be fiber-reinforced, in particular. The fibers can be made, e.g., from E-glass, polymer, aramid, carbon, metal, or ceramic. These can also be natural fibers. It is conceivable to use blended fibers in the form of fabrics, multidirectional fiber scrims, woven rovings, unidirectional non-wovens, crossply)(0°/90°, crossply)(0°/45°, fleeces, continuous fibers, or individual long- or short-fibers.

Expediently, the housing is electrically conductive. This makes it possible to dissipate electric charges via the housing and/or to shield the electronic unit against the effect of electromagnetic fields. The electronic unit and/or the transducer and/or the signal lines can be shielded. The shielding can be produced, e.g., by means of a silver conductive paste or by means of a fiber composite material made from carbon (CRP).

According to a particularly advantageous embodiment, a first modulus of elasticity of the first elastic material is less than a second modulus of elasticity of the second elastic material. Furthermore, it is advantageous when the second modulus of elasticity of the second elastic material is greater than a third modulus of elasticity of a material forming the component. It is therefore possible to compensate for a decrease in the modulus of elasticity by the transducer, the transducer plate, or the compensation zone. Relative movements and/or mechanical stresses can be compensated for particularly effectively without weakening the component.

Advantageously, the component is made from a fiber composite material. For example, the component can be made from CRP, GFRP, or an aramid-reinforced plastic (ARP).

The transducer can comprise at least one piezoelectric transducer. By means of such a transducer, it is possible to detect, e.g., dynamic strains of the component. Furthermore, natural oscillations can be analyzed. In addition, acoustic emission measurements and/or ultrasonic measurement procedures can be carried out. The use of a piezoelectric transducer also makes it possible to supply the measuring device with electric energy. Electric current delivered by the piezoelectric transducer can be stored, e.g., in an energy storage device of the measuring device. It is therefore possible to autonomously supply the electronic unit with electric current. In addition, it is possible to transmit measurement values wirelessly to a receiver disposed outside of the component.

According to an advantageous embodiment of the invention, the transducer comprises a flexible plate, into which the signal lines are integrated. The flexible plate advantageously has linearly elastic behavior. Said flexible plate can be made from a fiber-reinforced polymer, which is preferably made from epoxy resin.

The flexible plate and/or the housing can contain electrically conductive regions. Such regions can be located on the surface and/or can penetrate the material, in sections, perpendicularly to the surface in order to form plated through-holes. The electrically conductive regions can be made from the first or the second elastic material and/or from silver conductive paste.

The polymer can be made from a polymer prepreg and, advantageously, can have a $T_G \geq 120°$ C., preferably $T_G \geq 140°$ C. In the case of the polymer prepreg as well, the fibers contained therein can be made, e.g., from E-glass, polymer, aramid, carbon, metal, or ceramic. These can also be natural fibers. In this case as well, it is conceivable to use blended fibers in the form of fabrics, multidirectional fiber scrims, woven rovings, unidirectional non-wovens, crossply)(0°/90°, crossply) (0°/45°, fleece, continuous fibers, or individual long- or short-fibers.

The flexible plate can also be surrounded, at least partially, by the housing. It is also possible that the flexible plate extends from the housing. It is possible that the housing is mounted on the flexible plate. This makes it possible to incorporate the flexible plate into the component in a force-locked manner.

According to an advantageous embodiment, the transducer and the flexible plate are integrated in a unit in a force-locked and material-locked manner. The unit or the transducer, together with the flexible plate, form a single-piece element, which can be easily and reliably integrated into the component in a force-locked and material-locked manner.

Expediently, the housing can have a $T_G \geq 120°$ C., preferably $T_G \geq 140°$ C., at least in the region of the flexible plate. Particularly preferably, $T_G$ of the housing is equal to $T_G$ of the flexible plate.

According to another embodiment, the electronic unit is mounted onto the flexible plate, preferably with a printed circuit board having plated through-holes disposed therebetween, and is electrically connected to the signal lines. The electronic unit can also be accommodated in a plug base, however, which is electrically connected to the signal lines in the flexible plate. The electronic component can comprise one or more of the following components: passive electronic components, plugs/sockets, operational amplifiers, transponders, data memories, energy accumulators, frequency filters, A/D converters, radio module, peak detector, RFID module, antenna, shield, RAM, ROM, EPROM, EEPROM memory, temperature sensor, microelectromechanical systems (MEMS), or the like.

According to another aspect of the invention, a component having a measuring device according to the invention at least partially integrated therein is proposed, wherein the component is made from a fiber composite material and the housing is integrated into the component in a force-locked and material-locked manner, wherein the transducer is directly connected to the housing in a force-locked and material-locked manner, or wherein the housing as well as the transducer are integrated into the component in a force-locked and material-locked manner, wherein the housing is connected to the transducer via the component.

BRIEF DESCRIPTION OF THE DRAWINGS

Advantageous embodiments of the invention are described in greater detail in the following by reference to the drawings. In the drawings.

DETAILED DESCRIPTION OF THE INVENTION

Figure 1:
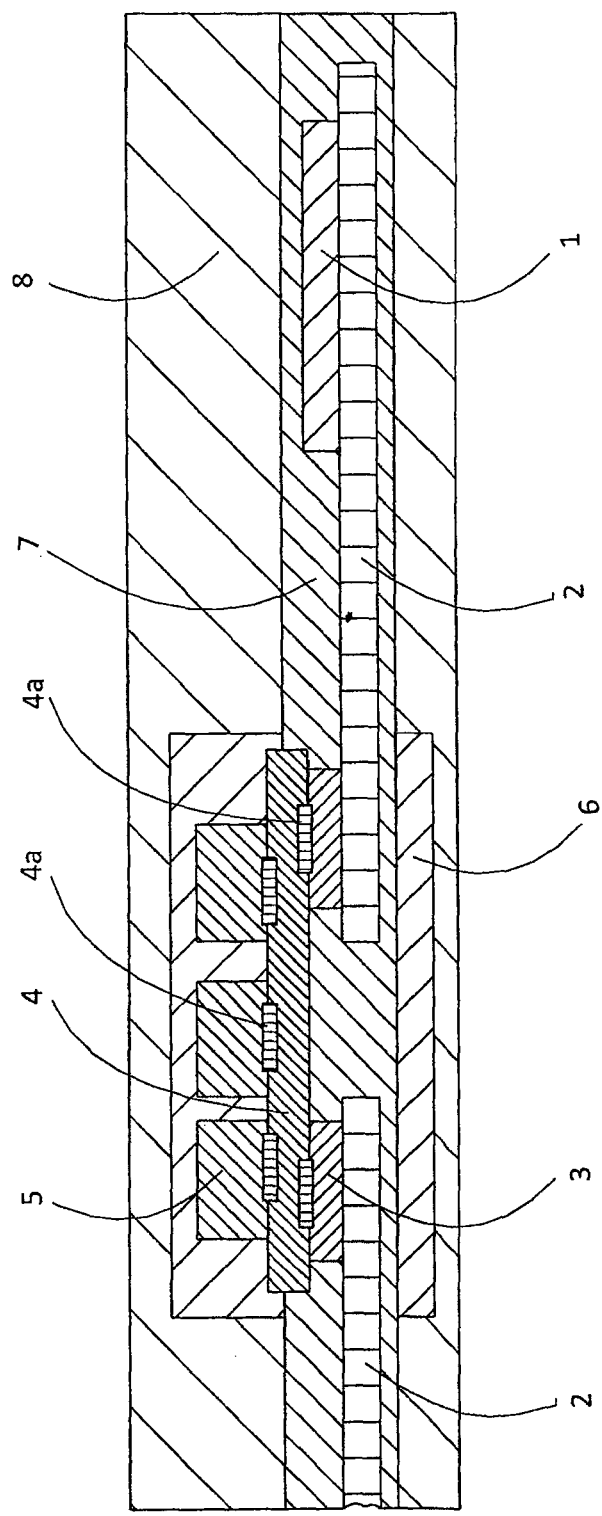
FIG. 1 shows a schematic side view of a first module.

An electromechanical transducer is labeled with reference sign 1 in each of FIGS. 1 to 4. The transducer 1 can be made, e.g., of a piezoelectric ceramic, or can comprise such a ceramic. Such a piezoelectric ceramic can be, e.g., PZT or the like, e.g., in the form of fibers, films, or the like. Reference sign 2 labels conductive tracks, which are made, e.g., from copper, aluminum, or electrically conductive polymers, such as, e.g., silver conductive varnish. The conductive tracks 2 are connected to a printed circuit board 4 by means of contact connections 3, which can be a solder, adhesive, or clip contact connection 4b (see FIG. 4). The printed circuit board 4 comprises plated through-holes 4a, by means of which electrical contact is established to the electronic units labeled with reference sign 5. The electronic units 5 can be passive electronic components, plugs/sockets, clip contacts, solder contacts, cables, operational amplifiers, transponders, data memories, energy accumulators, frequency filters, A/D converters, radio modules, peak detectors, temperature probes, microelectromechanical systems (MEMS), or the like.

The electronic units 5 are surrounded by a compensation zone, which is labeled with reference sign 6. The compensation zone 6 can be made from a first elastic material. This can be, e.g., silicone, polymer foam, epoxide, polyurethane, or the like. The first elastic material can also be fiber-reinforced.

In particular, the electromechanical functional element 1 and the conductive tracks 2 are integrated into a flexible plate 7, which is made from a polymer prepreg. The polymer prepreg is preferably reinforced by means of fibers, in particular glass fibers. The flexible plate 7 can comprise, in particular, a structured, raw surface for the force-locked and form-fitting connection to a material forming the component or to the housing 8. As is evident in FIGS. 1, 2 and 4, the contact connections 3 can also be integrated into the flexible plate 7. Furthermore, it is possible that the printed circuit board 4 is also integrated, at least partially, into the flexible plate 7.

The described arrangement of the flexible plate 7 and the compensation zone 6 formed here in the form of a damping encapsulation is surrounded by a housing 8. In this case, the housing 8 is produced in the form of a ductile encapsulation, which is made from a second elastic material. The second elastic material can be made, e.g., from another polymer prepreg, which is fiber-reinforced and has a structured, raw surface for the force-locked and form-fitting connection to a component.

Figure 2:
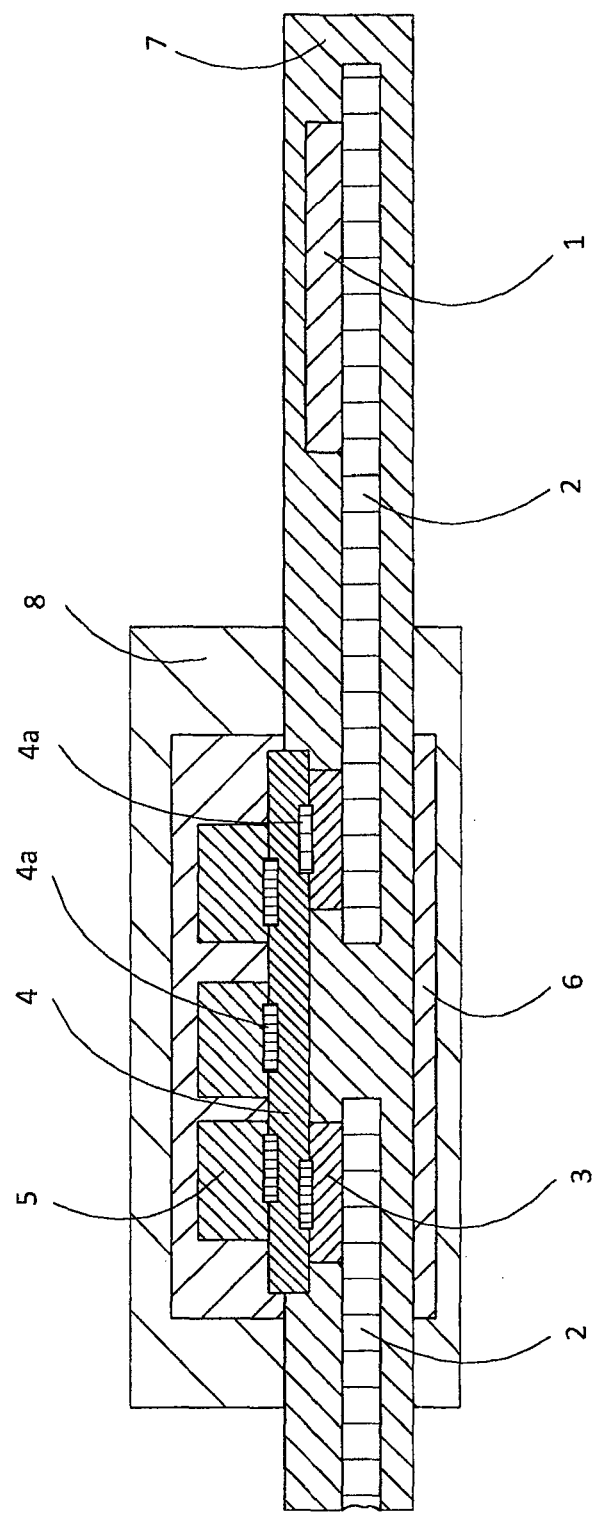
FIG. 2 shows a schematic side view of a second module.
Figure 3:
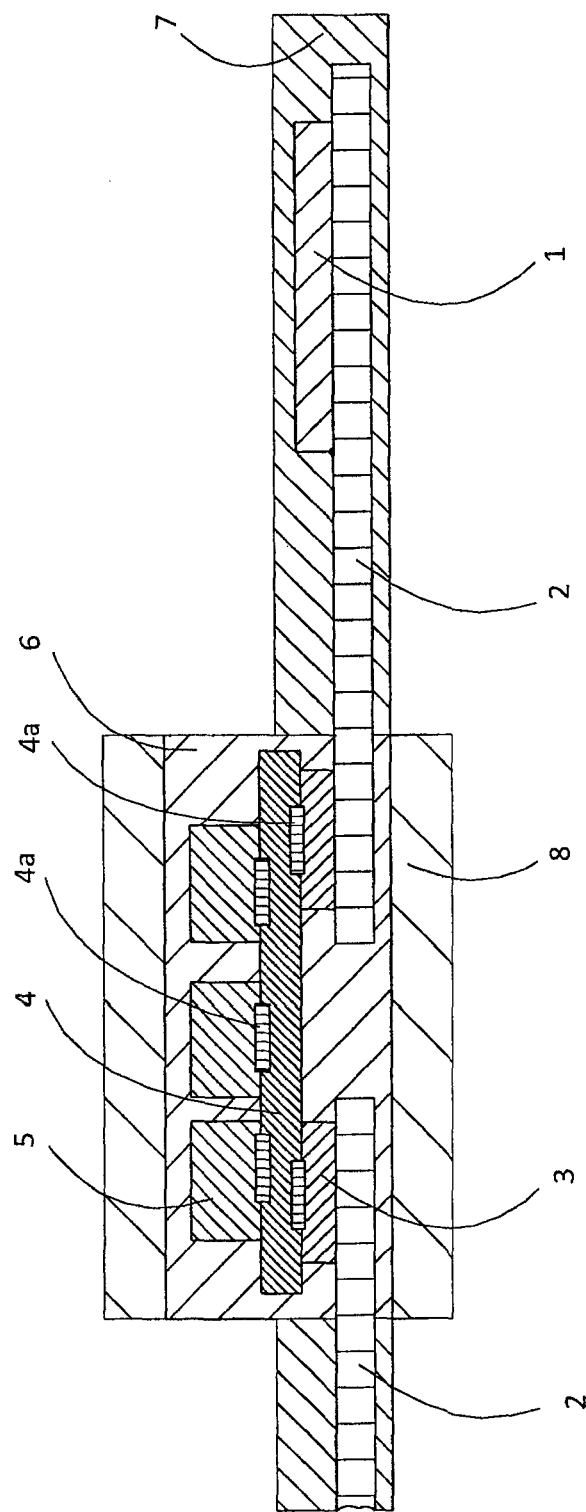
FIG. 3 shows a schematic side view of a third module.
Figure 4:
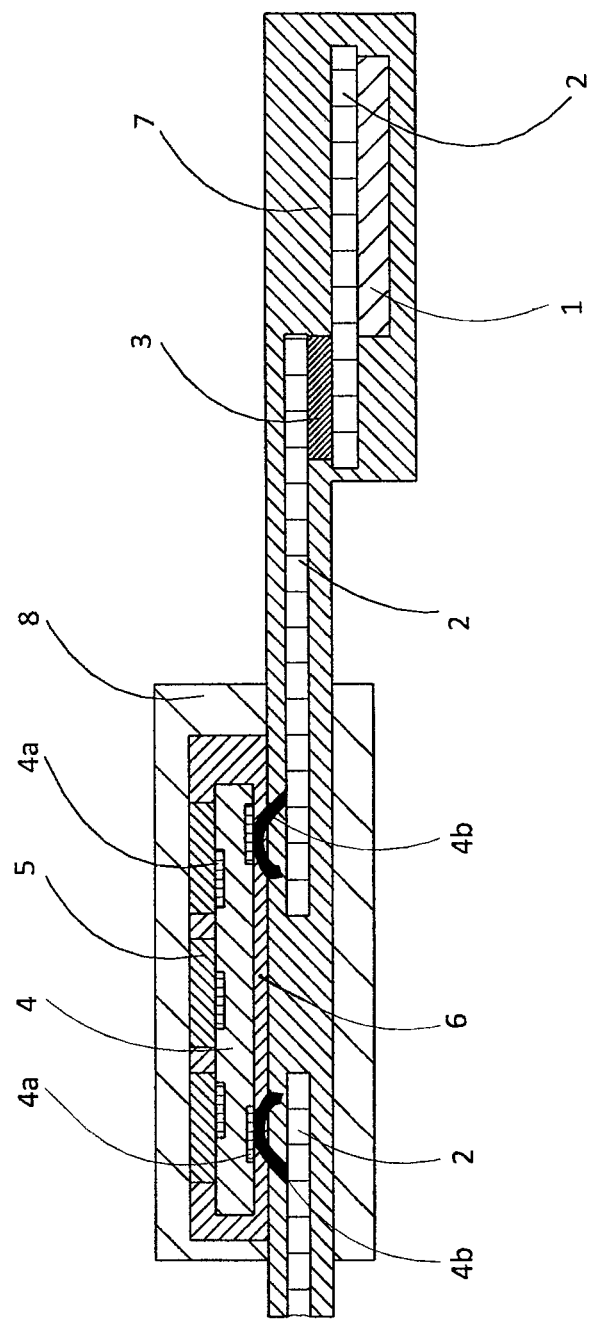
FIG. 4 shows a schematic side view of a fourth module.

As shown in FIGS. 2 to 4, in particular, the housing 8 does not need to surround the flexible plate 7 at all or in entirety. The contact connections 3 and the printed circuit board 4 can also be located in the compensation zone 6 or can be integrated into a first elastic material forming the compensation zone 6.

The first elastic material forming the compensation zone 6 has a first modulus of elasticity E1, which is less than a second modulus of elasticity E2 of the housing 8 surrounding the compensation zone 6. That is, the first elastic material is more easily elastically deformable than the second elastic material. Stresses acting on the housing 8 are first largely absorbed by a deformation of the second elastic material forming the housing 8 and, in addition, by an elastic deformation of the first elastic material forming the compensation zone 6. As a result, external stresses hardly affect the electronic units 5 or the connections thereof to the printed circuit board 4. The proposed measuring device is extremely robust and has an extremely long service life.

Figure 5:
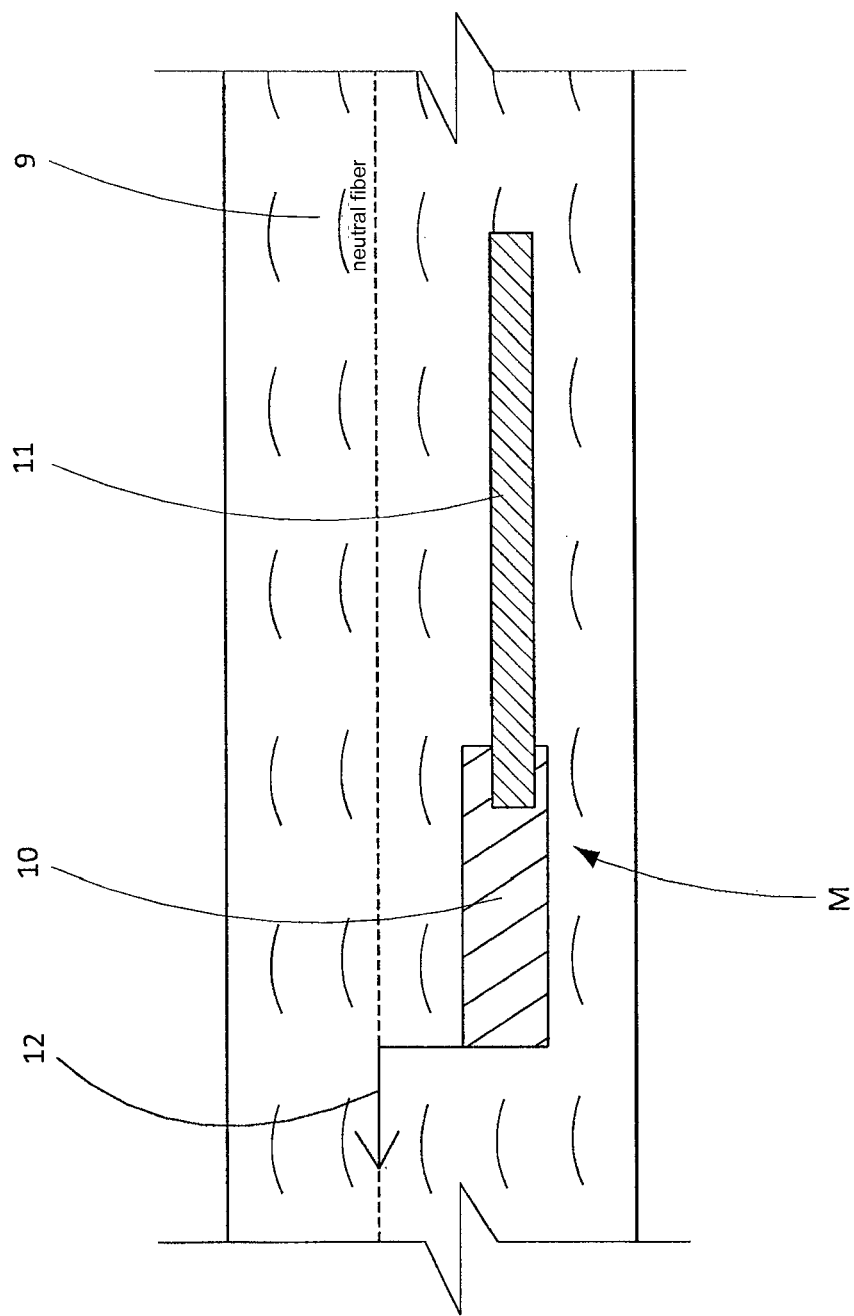
FIG. 5 shows the arrangement of a module in a component.
Figure 6:
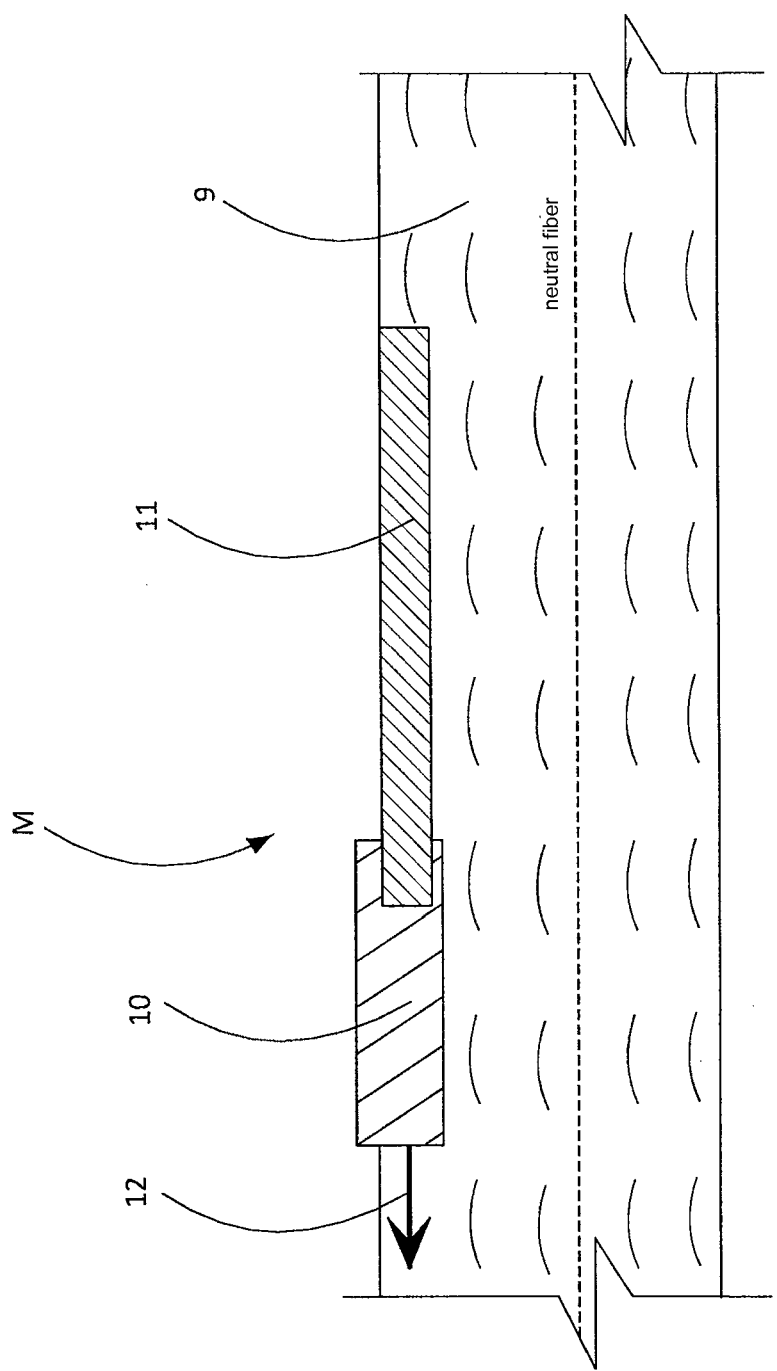
FIG. 6 shows another arrangement of the module according to FIG. 5 in a component.

FIGS. 5 and 6 show examples of an integration of a measuring device into a component, which is labeled in general with reference sign 9. The component 9 is made, e.g., from a fiber composite material, such as CRP, GFRP, ARP, or the like. The measuring device, which is labeled in general with reference sign M, has a first section 10, in which the electronic units 5 surrounded by the compensation zone 6 are disposed. A second section 11 of the measuring device M comprises the electromechanical transducer 1, which is integrated with the flexible plate 7, and the conductive tracks 2, at least in sections. The sections 10 and 11 can be at least partially surrounded by the housing 8, either individually or jointly. The modulus of elasticity of the housing 8 in this case is expediently greater than the modulus of elasticity of the material forming the component 9.

As is evident from FIG. 5, the measuring device M, in entirety, can be integrated into the component 9 outside of a neutral fiber. It is also possible that the measuring device M is at least partially integrated into the component 9 outside of the neutral fiber (see FIG. 6). The measuring device M can also be only applied onto the component 9.

The measuring device M can be designed to be energy-independent, i.e., the energy required to operate the measuring device M can be generated by means of the electromechanical transducer 1 and can be stored in an energy accumulator. The measurement values measured with the measuring device M can be transmitted wirelessly to a receiver located outside of the component 9.

As is evident from FIGS. 5 and 6, it is also possible, however, that the electronic units 5 contained in the first section 10 are connected via a cable 12 to another interface (not shown here), e.g., for power supply and/or data transmission. Expediently, the cable 12 can extend in the neutral fiber.

The measuring device M according to the invention can be used for the permanent on-line state monitoring and/or state display of a component. Said measuring device can be used, in particular, as a permanently functioning or energy-independent overload sensor.

By means of the proposed measuring device M, it is expediently possible to carry out state monitoring with site-sensitive state determination and state visualization, by recording load collectives, acoustic emissions, ultrasonic signals, and strain and vibration signals, respectively for discrete threshold values and frequency ranges, and to transmit these load collectives to receiving devices having evaluation software.

A component 9 provided with the measuring device M can be used as a "sensing component", for example for load detection, as an acoustic sensor, as a microphone, as a grain sound sensor, for detecting surface structures, for detecting material properties, for measuring accelerations, torque changes, natural frequencies, speeds, in particular wind speeds, turbulences in flows of gases or fluids, as a sound and/or ultrasound source or for generating mechanical vibrations, e.g., to generate acoustic or haptic information signals, or as a loud speaker.

LIST OF REFERENCE SIGNS 1 electromechanical transducer
2 conductive track
3 contact connection
4 printed circuit board
4a plated through-hole
4b clip contact
5 electronic unit
6 compensation zone
7 flexible plate
8 housing
9 component
10 first section
11 second section
12 cable
E1 first modulus of elasticity
E2 second modulus of elasticity
M measuring device

The invention claimed is:

1. A measuring device for measuring mechanical stresses or vibrations, comprising:
   a housing;
   at least one electromechanical transducer; and
   at least one electronic unit, which is connected to the transducer via signal lines and is used to record and process signals delivered by the transducer,
   wherein the electronic unit is at least partially surrounded by the housing, and a compensation zone for absorbing relative movements between the housing and the electronic unit is provided between the electronic unit and the housing, and
   the transducer and the signal lines are integrated in a flexible plate, made from a fiber-reinforced polymer and having a linearly elastic behavior, the flexible plate extending from the housing, and being directly connected to the housing in a force-locked and material-locked manner, and therefore the housing and the transducer form substantially a single piece element with respect to propagation of vibrations.

2. The measuring device according to claim 1, wherein the compensation zone is formed by a layer made from a first elastic material.

3. The measuring device according to claim 2, wherein the first elastic material is a material having a first modulus of elasticity in a range of 0.001 to 10 GPa and/or non-linear elastic behavior.

4. The measuring device according to claim 2, wherein the layer is produced by casting around the electronic unit.

5. The measuring device according to claim 2, wherein the first elastic material is made from one of following materials: PP, TPU, PA, PPS, epoxide, LCP, TPI, PAI, PPS, PPSU, PEK, PEEK, phenol, PE, silicone, rubber, and polymer foam.

6. The measuring device according to claim 1, wherein the compensation zone is a gap surrounding the electronic unit.

7. The measuring device according to claim 3, wherein the housing is made from a second elastic material.

8. The measuring device according to claim 7, wherein the second elastic material is a material having largely linear elastic behavior.

9. The measuring device according to claim 7, wherein the second elastic material is made from one of following materials: epoxide, PA, phenol, PE, PU, PP, TPU, LCP, TPI, PAI, PA, PPS, PPSU, PI, PEK, and PEEK.

10. The measuring device according to claim 7, wherein the first modulus of elasticity of the first elastic material is less than a second modulus of elasticity of the second elastic material.

11. The measuring device according to claim 1, wherein the transducer comprises at least one piezoelectric transducer.

12. The measuring device according to claim 1, wherein the flexible plate is at least partially surrounded by the housing.

13. The measuring device according to claim 8, wherein the first material and/or the second material are made from a fiber-reinforced polymer.

14. The measuring device according to claim 1, wherein the electronic unit is mounted onto the flexible plate with a printed circuit board having plated through-holes disposed therebetween, and is electrically connected to the signal lines.

15. The measuring device according to claim 1, wherein the electronic unit comprises at least one of following components: passive components, plugs/sockets, clip contacts, solder contacts, cables, operational amplifiers, transponders, data memories, energy accumulators, frequency filters, A/D converters, radio module, peak detector, RFID module, antenna, shield, temperature sensor, and MEMS.

16. A component comprising the measuring device according to claim 1 at least partially integrated therein, wherein the component is made from a fiber composite material and the housing is at least partially directly connected to the component in a force-locked and material-locked manner.

17. The measuring device according to claim 1, further comprising a printed circuit board on which the electronic unit is mounted, and partially integrated in the flexible plate to electrically connect the electronic unit and the transducer through the signal lines,
   wherein the compensation zone surrounds the flexible plate in the housing to entirely cover the electronic unit and a portion of the printed circuit board not integrated in the flexible plate.

* * * * *